(12) United States Patent
Rigollet

(10) Patent No.: US 9,016,731 B2
(45) Date of Patent: Apr. 28, 2015

(54) CLAMPING SYSTEM FOR CONNECTING TOGETHER AND FOR PRE-FITTING A FIRST TUBE AND A SECOND TUBE

(75) Inventor: Nicolas Rigollet, Romorantin Lanthenay (FR)

(73) Assignee: Etablissements Caillau, Issy les Moulineaux (FR)

( * ) Notice: Subject to any disclaimer, the term of this patent is extended or adjusted under 35 U.S.C. 154(b) by 0 days.

(21) Appl. No.: 13/811,071

(22) PCT Filed: Jul. 19, 2011

(86) PCT No.: PCT/FR2011/051743
§ 371 (c)(1),
(2), (4) Date: Mar. 26, 2013

(87) PCT Pub. No.: WO2012/013891
PCT Pub. Date: Feb. 2, 2012

(65) Prior Publication Data
US 2013/0207389 A1    Aug. 15, 2013

(30) Foreign Application Priority Data
Jul. 27, 2010   (FR) ...................................... 10 56175

(51) Int. Cl.
*F16L 23/00* (2006.01)
*F16L 23/04* (2006.01)
*F16L 23/08* (2006.01)

(52) U.S. Cl.
CPC .............. *F16L 23/04* (2013.01); *F16L 23/003* (2013.01); *F16L 23/08* (2013.01)

(58) Field of Classification Search
USPC ......... 285/334.5, 365, 407, 420, 367, 410, 23
See application file for complete search history.

(56) References Cited

U.S. PATENT DOCUMENTS

| | | | | | |
|---|---|---|---|---|---|
| 2,841,420 | A | * | 7/1958 | Woolsey et al. | 285/367 |
| 2,842,385 | A | * | 7/1958 | Webster et al. | 285/367 |
| 3,006,663 | A | * | 10/1961 | Bowne | 285/367 |
| 3,235,293 | A | * | 2/1966 | Condon | 285/367 |
| 3,298,698 | A | * | 1/1967 | Condon | 285/367 |
| 6,030,005 | A | * | 2/2000 | Andersson et al. | 285/367 |
| 6,702,338 | B2 | * | 3/2004 | Vanasse | 285/410 |
| 6,877,780 | B2 | * | 4/2005 | Potts et al. | 285/367 |
| 7,393,020 | B2 | * | 7/2008 | Hartig et al. | 285/367 |
| 7,399,005 | B2 | * | 7/2008 | Rigollet et al. | 285/410 |
| 8,020,898 | B2 | * | 9/2011 | Ignaczak | 285/367 |
| 2005/0017510 | A1 | | 1/2005 | Rigollet et al. | |
| 2005/0099001 | A1 | | 5/2005 | Cassel et al. | |
| 2008/0185841 | A1 | | 8/2008 | Ignaczak et al. | |

FOREIGN PATENT DOCUMENTS

| | | |
|---|---|---|
| CA | 2117216 | 9/1994 |
| EP | 1451498 | 9/2004 |

\* cited by examiner

*Primary Examiner* — David E Bochna
(74) *Attorney, Agent, or Firm* — Hamre, Schumann, Mueller & Larson, P.C.

(57) ABSTRACT

The system includes a collar (10) and a washer (28), the collar having a tightenable band (12) suitable for co-operating with bearing surfaces (16, 18) of the interconnected tubes (1, 2) via its inside periphery defining a setback (14). The washer (28) is secured to the collar and the system further includes first pre-fitter (38) for acting when the collar is in the non-tightened state to secure the collar to the first tube when the bearing surface (16) of the first tube is engaged in the setback (14). The clamping system further includes second pre-fitter (40) for acting, when the collar (10) is secured to the first tube (1) by the first pre-fitter (38), to secure the collar to the second tube (2) when the bearing surface (18) of the second tube (2) is also engaged in the setback (14).

19 Claims, 9 Drawing Sheets

CLAMPING SYSTEM FOR CONNECTING TOGETHER AND FOR PRE-FITTING A FIRST TUBE AND A SECOND TUBE

FIELD

The present invention relates to a clamping system for connecting together a first tube and a second tube.

BACKGROUND

A clamping system for connecting together a first tube and a second tube, the facing ends of the tubes having bearing surfaces that project relative to the cylindrical outside surfaces of said tubes, the system comprising a collar and a washer, the collar having a band suitable for co-operating with said bearing surfaces via its inside periphery defining a setback into which the bearing surfaces can be inserted, and means for tightening said band, the washer being secured to the collar by fastening means, the system further comprising first pre-fitting means for acting when the collar is in the non-tightened state to secure said collar to the first tube when the bearing surface of said first tube is engaged in the setback.

A clamping system of this type is known from European Patent No. EP 1 451 498. The cross-section of the band of the collar is, for example, substantially V-shaped or U-shaped, so that the flanges formed by the cross-sectional shape bear respectively against the bearing surface of the first tube and against the bearing surface of the second tube. Thus, tightening the collar tends to hold the tubes clamped one against the other. A V-shaped cross-section is advantageous insofar as, when the collar is tightened, it urges the tubes together.

For example, the means for tightening the band comprise a nut-and-bolt system. Thus, the ends of the band can be turned out so as to form bearing tabs provided with holes through which a bolt can be inserted. A nut is disposed behind one of the tabs so that turning the bolt causes the collar to be tightened. However, other tightening means may be provided, e.g. of the type operating by hooking, and in particular of the type comprising a hook that is turned out relative to the band and a lug also turned out relative to the band, the hook hooking behind the lug to maintain the collar in the tightened state.

The washer of the clamping system may, in particular, serve to seal the interconnection between the two tubes, by having, for this purpose, a sealing portion that, when the system is tightened onto the tubes, is sandwiched between two sealing surfaces belonging respectively to the first tube and to the second tube.

In EP 1 451 498, the washer is secured to the collar by means of the fastening tabs with which that washer is provided, and the entire clamping system can be held pre-fitted to the first tube, by means of the pre-fitting tabs with which the washer is provided. Thus, in order to assemble the two tubes together, it is possible to pre-fit the clamping system onto the first tube and to bring the second tube closer to the first tube, before tightening the collar. In EP 1 451 498, this possibility of pre-fitting the clamping system onto the first tube constitutes a significant advantage over the pre-existing prior art in that it simplifies assembling the tubes together and connecting them together by tightening the collar.

However, that assembly operation firstly requires the second tube to be held in position relative to the assembly made up of the first tube and of the clamping system as pre-fitted on said first tube, and secondly requires the collar to be tightened by performing the appropriate manipulation. In practical terms, when assembly is performed by hand, the operator must, firstly, hold the second tube in position with one hand, and secondly perform the tightening with the other hand. The operator must therefore synchronize these movements exactly and, if tightening is not readily achievable, said operator cannot let go of the second tube to complete the tightening properly.

SUMMARY

There therefore exists a need for the clamping system of EP 1 451 498 to be further improved in order to remedy the above-mentioned drawbacks and, in particular, so as to obviate the need to keep hold of the second tube in order to keep it in position while performing tightening at the same time.

This object is achieved by means of the fact that the clamping system of the invention further comprises second pre-fitting means for acting when the collar is secured to the first tube by the first pre-fitting means to secure said collar to the second tube when the bearing surface of said second tube is also engaged in the setback.

Thus, with the clamping system of the invention, the second tube can be put in position and retained in the pre-fitted state by using the second pre-fitting means. The operator can thus perform the tightening by activating the tightening means, without the operator having to hold the tubes together at the same time.

Advantageously, the first and/or the second pre-fitting means equip the washer.

The washer then serves for pre-fitting, on one and/or the other tube, without it being necessary to provide the collar or the tubes with very specific configurations.

Advantageously, the first pre-fitting means comprise first deformable pre-fitting tabs suitable for co-operating with the first tube.

Advantageously, the second pre-fitting means comprise second deformable pre-fitting tabs suitable for co-operating with the second tube.

Advantageously, the fastening means comprise deformable fastening tabs that are integral with the washer.

The washer is in general made of metal, by die-stamping, cutting-out, and folding. When manufacturing the washer, it is easy to form tabs on it that constitute first pre-fitting tabs and/or second pre-fitting tabs and/or fastening tabs.

In an advantageous embodiment, the fastening means, the first pre-fitting means and the second pre-fitting means are integral with the washer.

The washer then, by itself, forms both the first and the second pre-fitting means.

In another advantageous embodiment, the fastening means and the first pre-fitting means are integral with the washer, and the clamping system further comprises an additional washer, secured to the collar by additional fastening means, the second pre-fitting means being integral with the additional washer.

Two substantially analogous washers can then be provided or, at the least, two washers equipped with analogous pre-fitting means can be provided. For example, one of them may, in addition, serve to seal the connection between the tubes, while the other serves only to pre-fit one of the tubes relative to the clamping system.

Advantageously, the washer includes an annular sealing portion suitable for being sandwiched between first and second sealing surfaces belonging respectively to the first tube and to the second tube, when said tubes are clamped by means of the clamping system.

The washer thus has a sealing function.

Advantageously, the washer has a substantially frustoconical portion.

As explained below, it is advantageous for the tubes to co-operate with each other via frustoconical surfaces, and the washer is then adapted to match this co-operation shape.

Advantageously, the washer has an inside portion that extends substantially axially.

Advantageously, the inside portion then extends from an inside edge of the substantially frustoconical portion by forming a turned-back segment.

The substantially axial inside portion may serve to "cover over" the space provided under the bearing surface of the second tube, as in FR 2 906 864. Depending on its position, it can also serve to center the second tube while said second tube is being pre-fitted relative to the assembly made up of the first tube and of the clamping system.

BRIEF DESCRIPTION OF THE DRAWINGS

The invention can be well understood and its advantages appear more clearly on reading the following detailed description of embodiments shown by way of non-limiting example. The description refers to the accompanying drawings, in which.

DETAILED DESCRIPTION

Figure 1A:
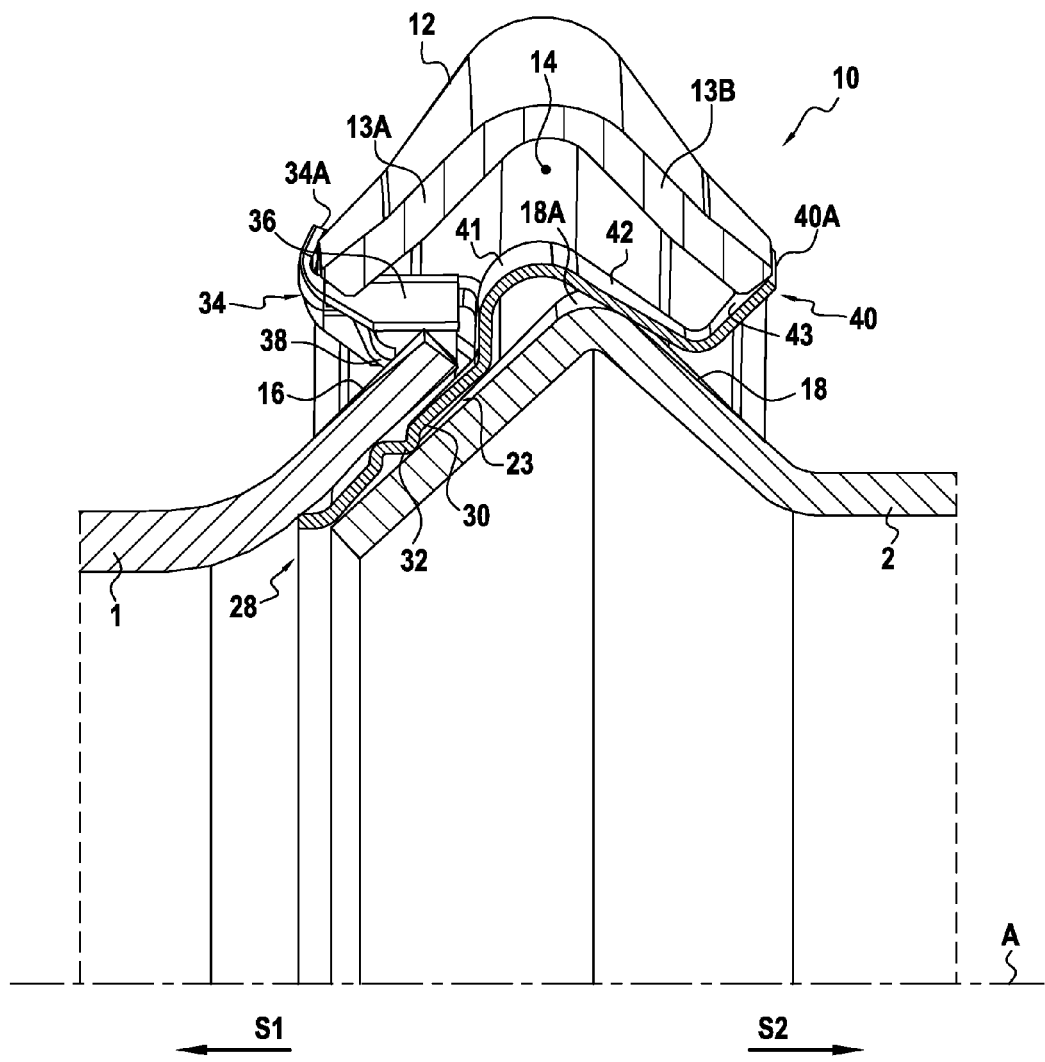
FIGS. 1A and 1B are axial section views of the clamping system of the invention, as pre-fitted on a first and on a second tube that are to be connected together.
Figure 1B:
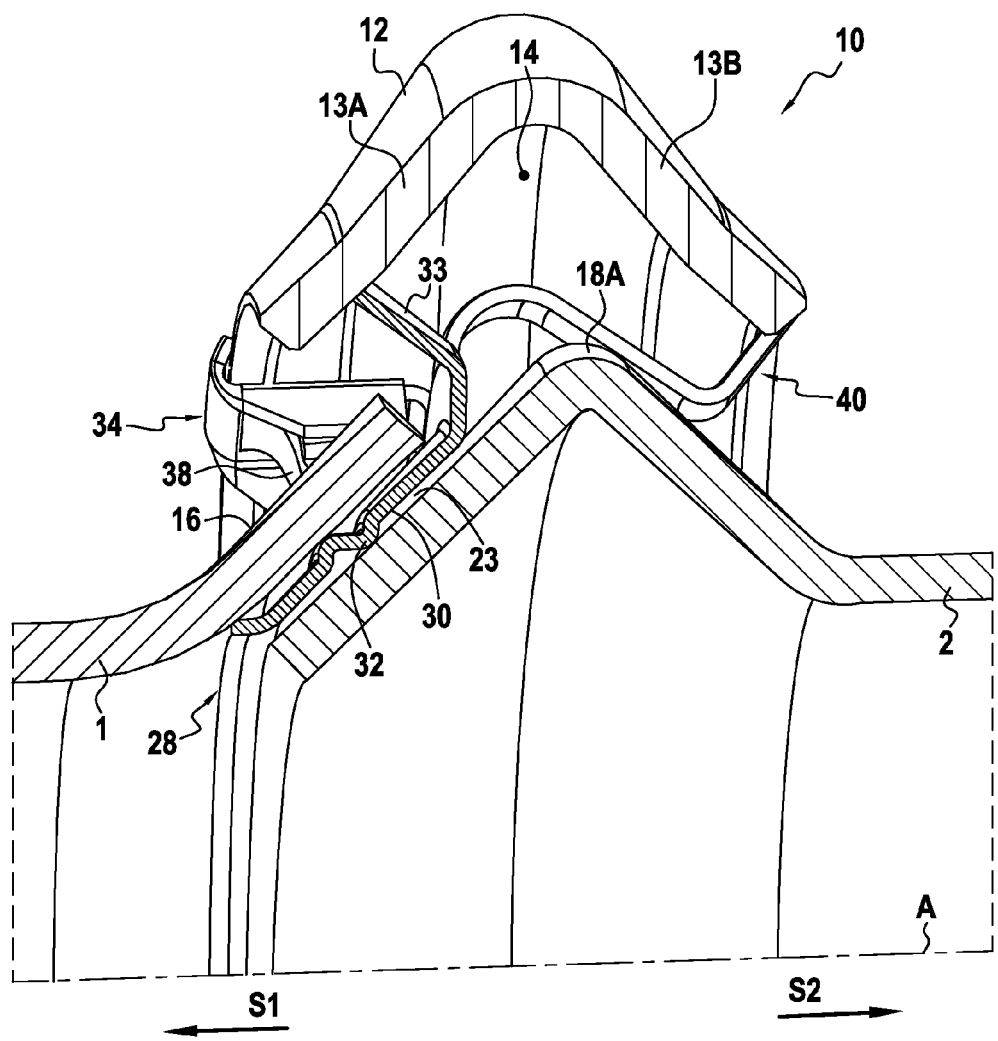
Figure 2:
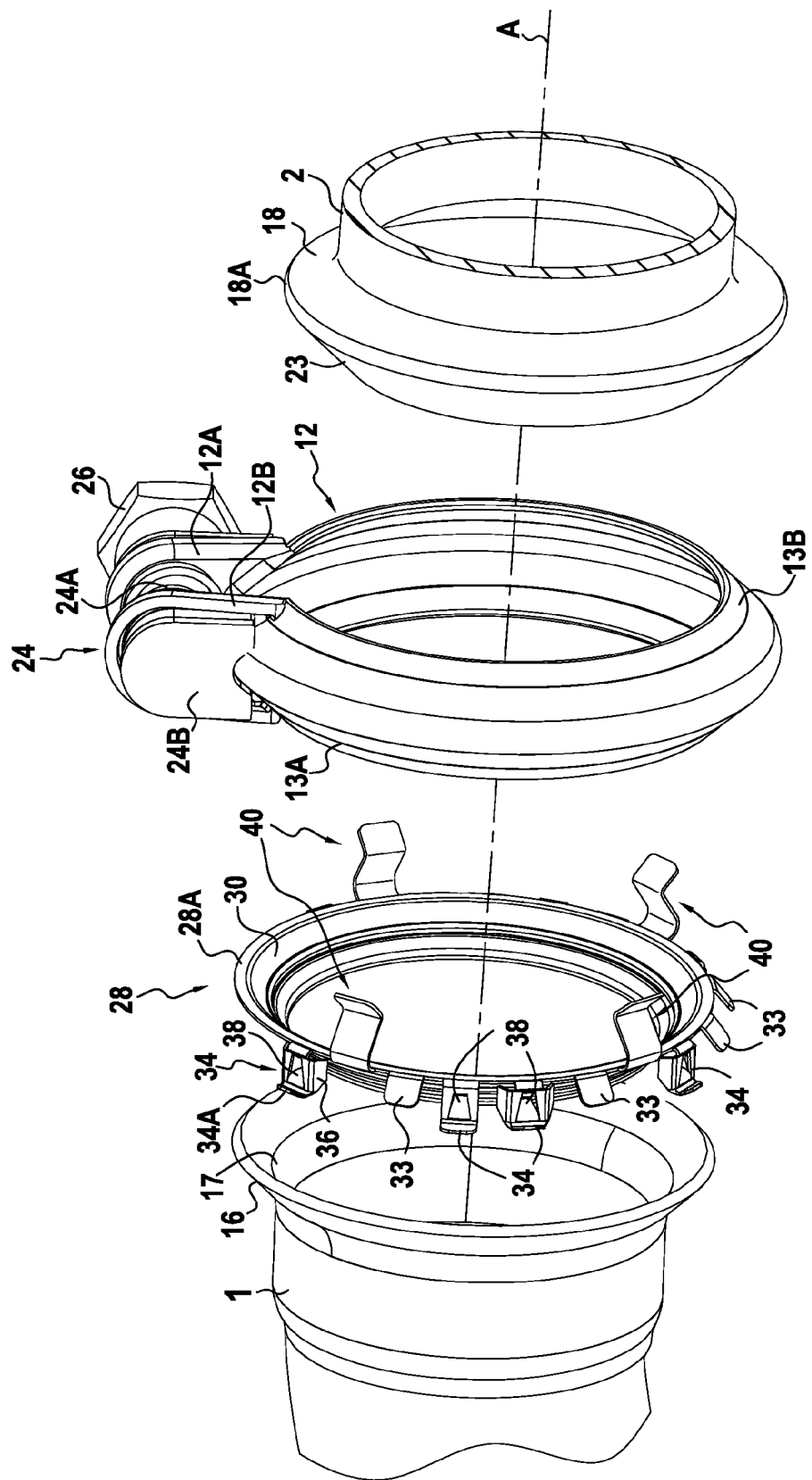
FIG. 2 is an exploded view showing the clamping system comprising the clamping collar and a washer, as separated from each other, and also showing the first and second tubes.

Firstly, FIGS. 1A, 1B, and 2 are described. It can be seen in these figures that the clamping system comprises a collar 10 that is substantially of the same type as described in EP 1 451 498, and a washer 28, the collar and the washer co-operating to assemble together two tubes 1 and 2.

Throughout the description below, the term "inside" is used to describe elements that face towards the axis A of the two tubes as placed end-to-end or that are closer to that axis relative to other elements that are said to be "outside", "outside" elements also being those that face away from the axis A.

The collar comprises a band 12 that, as can be seen in FIGS. 1A and 1B, has an inside periphery that defines a setback 14 into which bearing surfaces 16 and 18 belonging respectively to the first tube 1 and to the second tube 2 can be inserted. This setback and these bearing surfaces have shapes such that tightening the band of the collar constrains the ends of the tubes to move closer together. Thus, the band 12 is advantageously V-shaped in cross-section, while the diameter of each of the bearing surfaces 16 and 18 increases gradually going towards the facing free ends of the tubes, and said bearing surfaces are, for example, frustoconical in shape. The band 12 has ends, respectively 12A and 12B, which are turned out substantially radially in such a manner as to form bearing tabs. These tabs are provided with holes so as to enable the shank 24A of a bolt 24 to pass through said tabs. The head 24B of the bolt can be wedged relative to one of the bearing tabs (tab 12B in this example), while a nut 26 is retained relative to the other bearing tab 12A. It can be understood that the nut being turned in the tightening direction urges the bearing tabs towards each other and thus reduces the inside diameter of the collar, i.e. makes it possible to tighten the band.

The clamping system further comprises the washer 28, which is secured to the collar. The washer has a frustoconical annular portion 30 that, as can be seen in FIGS. 1A and 1B, can be inserted between the facing ends of the two tubes when they are clamped by means of the clamping system.

It should be noted that the end of the tube 1 is a female end, its inside periphery being flared. Conversely, the end of the tube 2 is a male end that, beyond the bearing surface 18, has an outside periphery 23, the diameter of which decreases going towards the free end. The end portion formed in this way can thus be inserted, substantially with shape complementarity, inside the flare 17 formed at the free end of the tube 1. The frustoconical portion 30 of the washer is situated between the flare 17 and the outside periphery 23 of the free end of the tube 2. The frustoconical portion of the washer 30 has annular deformations 32 forming a sealing bead. The flare 17 formed at the inside periphery of the free end of the tube 1, and the outside periphery of the end portion 23 of the tube 2 thus form sealing surfaces that, when the clamping system is tightened, sandwich between them the frustoconical portion 30 of the washer and press the sealing bead 32, so that the connection between the tubes is sealed.

The washer can be fastened to the collar and the assembly made up of the collar and of the washer can be pre-fitted onto the first tube in the same way as in EP 1 451 498, by fastening tabs with which the washer is provided.

Thus, the washer has a series of inside tabs 33 that can be seen more clearly in FIG. 1B. When the washer is assembled to the collar, these inside tabs co-operate with the inside periphery of one of the branches of the band 12, namely the branch 13A in this example. These inside tabs serve to keep the washer apart from the inside periphery of the branch 13A. The fastening tabs further comprise outside tabs 34 that, as can be seen in particular in FIGS. 1A and 1B are long enough to come into contact with the free inside edge of the branch 13A. The inside tabs may be raised radially slightly in the direction going towards their free ends, in such a manner that said free ends come to bear more securely against the inside periphery of the branch 13A. Conversely, the outside tabs are directed substantially axially in such a manner as to pass under the free inside edge of the branch 13A. It can be seen that the free ends of said outside tabs 34 curve back to form hooks 34A that come to hook onto the outside face of the branch 13A.

In this example, the outside tabs 34 also make it possible to pre-fit the clamping system on the tube 1. It can be seen that tongues 38 are cut out from the outside tabs in such a manner as to have free ends directed towards the joining zone at which the outside tabs join the washer, while being turned radially inwards in such a manner as to hook onto the bearing surface 16 of the tube 1. These tongues 38 thus form what might be termed "punched-out portions", provided in the axial portions of the outside tabs 34 and folded back towards the inside so as to come to cling onto the bearing surface 16. Naturally, provision could be made for the clinger tongues 38 to be formed in outside tabs that are not provided with hook-shaped free ends 34A.

It can also be observed that, on their longitudinal edges, the outside tabs have flanges 36 that are folded back towards the inside. These folded-back flanges 36 contribute to fastening the washer relative to the collar and impart a certain amount of rigidity to the tabs 34 so as to prevent them from deforming too easily. However, the above-mentioned fastening tabs, namely the tabs 33 and 34, deform during tightening so as to be pressed against the inside periphery of the branch 13A of the band 12 of the collar, and thus so as not to oppose the tightening.

The tongues 38 of the outside tabs constitute first pre-fitting tabs that enable the assembly made up of the washer and of the collar to be pre-fitted onto the first tube 1. Thus, the fastening means and the first pre-fitting means are integral with the washer 28. In the embodiment shown in FIGS. 1A to 8B, second pre-fitting means, making it possible to pre-fit the assembly made up of the collar and of the washer onto the second tube, are integral with the washer. The above-described fastening tabs 33 and 34 and the first pre-fitting tabs constituted by tongues 38 cut out from the tabs 34 are situated on a first side of the washer in a first axial direction S1. In this example, this first axial direction is the one that goes along the axis A away from the branch 13B of the band 12 of the collar from the junction where this branch joins the branch 13A.

In FIGS. 1A to 8B, the second pre-fitting means comprise second pre-fitting tabs 40 that are situated on a second side of the washer, opposite from the first side, and that, in this example, extend in the axial direction S2 from the outside periphery 28A of the washer. In the embodiment shown, and as can be seen more clearly in FIG. 6, these second pre-fitting tabs 40 are formed by pre-deformed tabs that, in the axial section shown in FIG. 1, comprise a joining segment 41 joining to the washer and extending outwards from the washer (more precisely from the outside periphery 28A of the washer), and a securing segment 42 for securing to the second tube 2 and that extends between the joining segment 41 and the free end 40A of the pre-deformed tab 40 while pointing inwards in the direction going towards said free end 40A.

It can also be seen that each pre-deformed tab 40 further comprises a retaining segment 43 that extends between the securing segment 42 for securing to the second tube 2 and the free end 40A of the pre-deformed tab, while pointing outwards in the direction going towards said free end 40A. It can be understood from FIGS. 1A and 1B that said retaining segment 43 can co-operate with the band 12 of the collar to retain the pre-deformed tab 40 relative to said band. In this example, the retaining segment 43 is retained against the inside edge of the second branch 13B of the band 12. In the example shown, all of the second pre-fitting tabs are formed by the above-described pre-deformed tabs. However, it is conceivable for the second pre-fitting tabs to comprise at least one pre-deformed tab of the above-described type, with or without the retaining segment 43, and other tabs of simpler form, in particular extending substantially axially in the direction S2 and being deformed merely when the bearing surface 18 of the second tube is inserted into the setback 14 formed inside the band 12 of the collar. Naturally, it is advantageous for the washer to have at least two diametrically opposite pre-deformed tabs, or indeed three or four pre-deformed tabs disposed uniformly angularly spaced apart from one another, so as to center the second tube while it is being pre-fitted relative to the assembly made up of the clamping collar and of the pre-fitted washer.

Advantageously, the second pre-fitting tabs include at least one tab that is of substantially constant width. In this example, in the variant shown in FIG. 6, the second pre-fitting tabs comprise four pre-deformed tabs 40 and all of the tabs have the same width l that is substantially constant over their entire length.

Figure 7B:
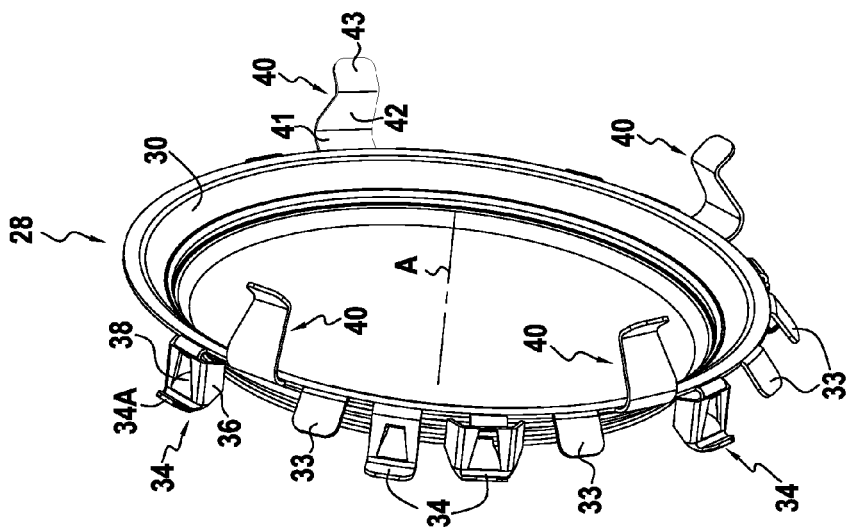
FIGS. 6, 7A, 7B, and 7C are perspective views showing a washer usable in the embodiment shown in FIGS. 1 to 5.
Figure 7A:
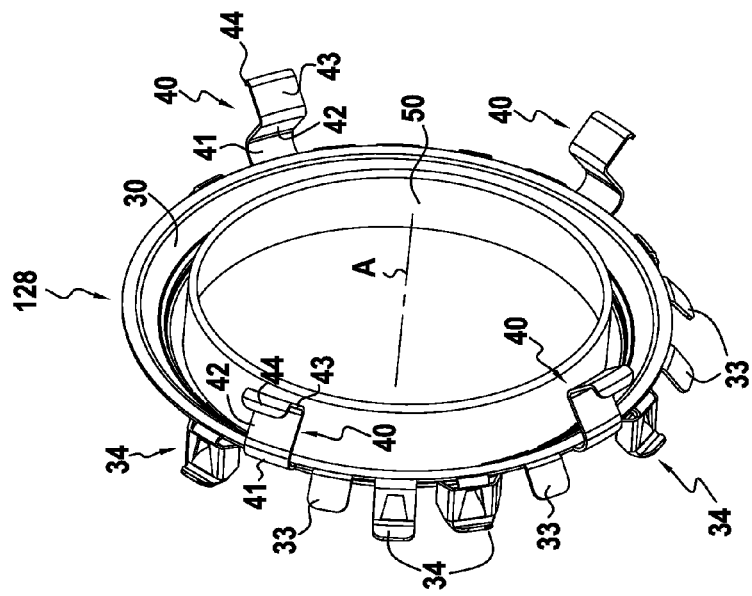

This also applies to the variant shown in FIG. 7A. However, the washer 128 in this variant differs in two respects from the washer 28 that is described above with reference to FIG. 6.

Firstly, the free ends 40A of the pre-deformed tabs 40 curve back to form hooks 44 that, when the washer 128 is fastened to the collar 10, come to hook onto the outside periphery of the second branch 13B of the band 12 of the collar.

Secondly, the washer 128 has an inside portion 50 that extends substantially axially. In this example, this washer 128 has a frustoconical portion 30 analogous to the frustoconical portion of the washer 28, and the substantially axial inside portion 50 extends from an inside edge 30A of the frustoconical portion 30 by forming a turned-back segment. This turned-back segment may have the same function as disclosed in FR 2 906 864 and serve to "bridge" the cavity provided at the end of the tube 2, under the bearing surface 18 and the frustoconical free end portion. In addition, as can be seen in FIG. 8A, the outside periphery of the inside portion 50 can come to co-operate with the free end edge of the second tube 2 so as to center the second tube relative to the washer while it is being pre-fitted.

Figure 6:
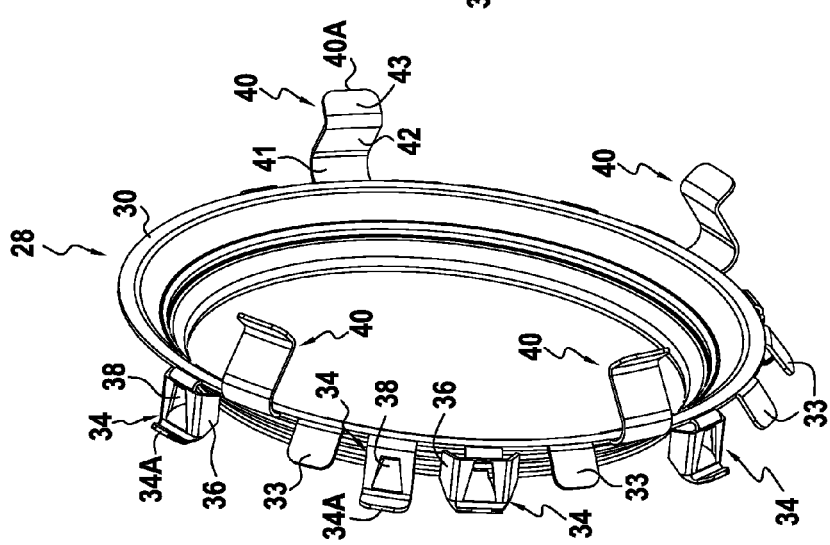

The washer shown in FIG. 7B is analogous to the washer shown in FIG. 6, except that the pre-deformed tabs 40 have a width that decreases in the direction going towards to their free ends. This makes it possible to increase the flexibility of these tabs going towards their free ends, and to make provision so that, in the vicinity of said free ends, they occupy only an angular range that is relatively small. Naturally, it is possible to make provision for only one of the second pre-fitting tabs to have such a tapering width.

Figure 7C:
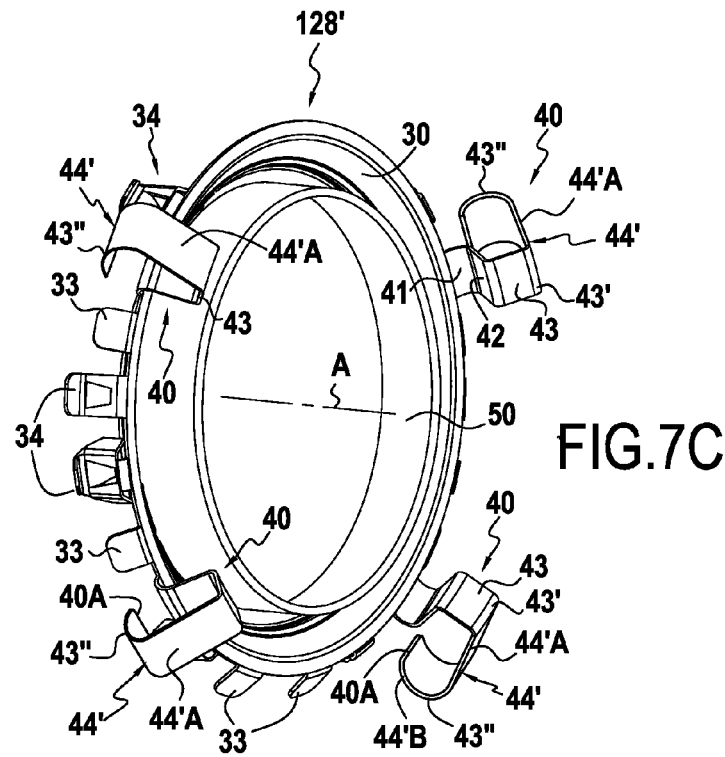
Figure 8B:
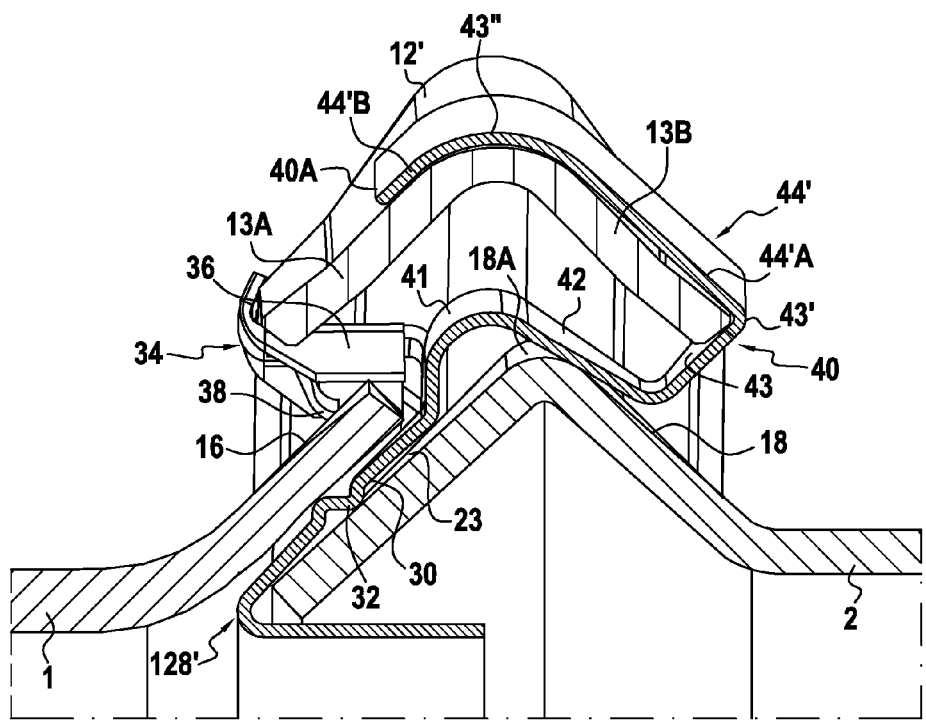
FIG. 8B is a view analogous to the FIG. 1A view, but with a clamping system using the FIG. 7C washer.
Figure 8A:
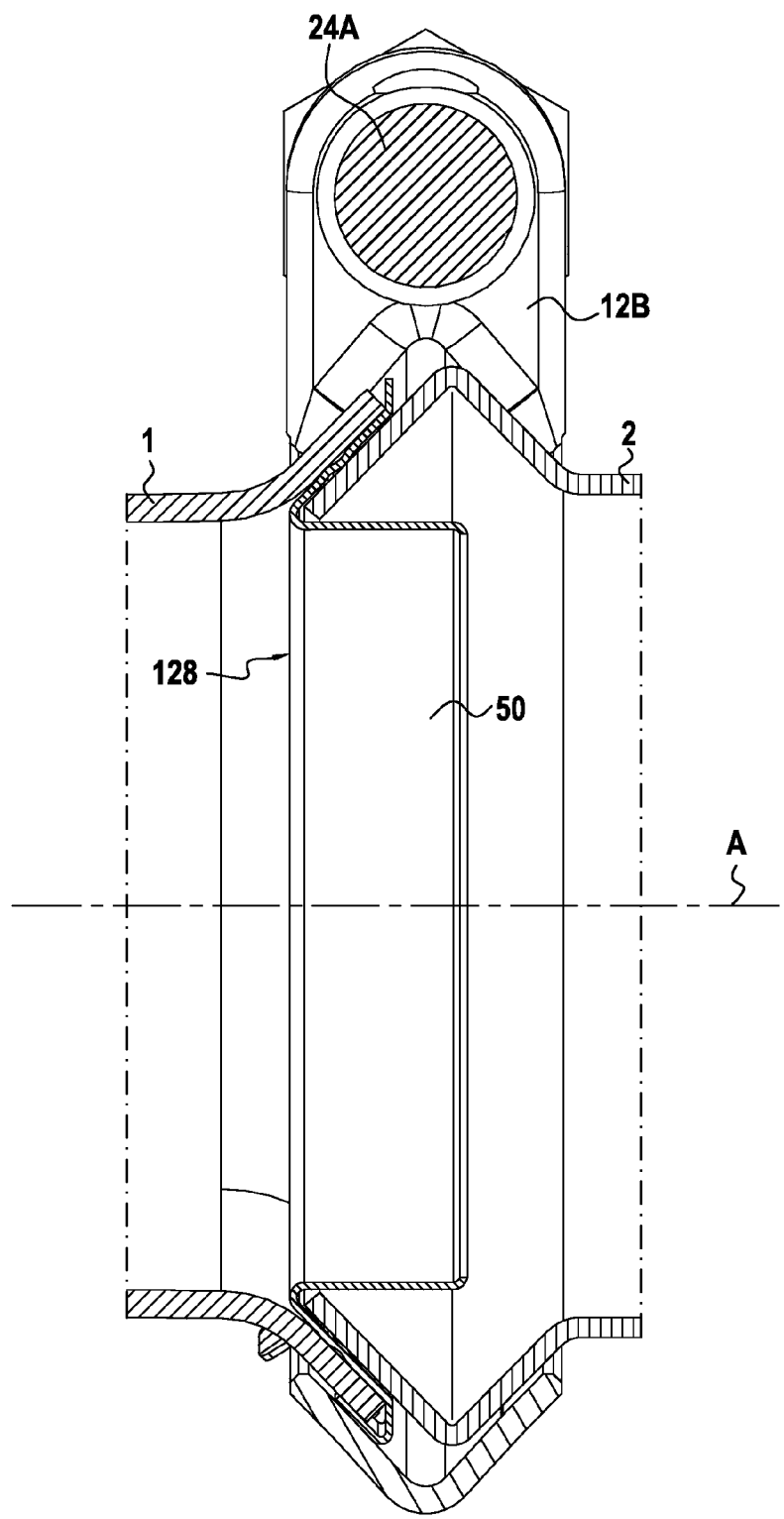
FIG. 8A is an axial section view showing a clamping system using the FIG. 7B washer, as fitted on two tubes that are connected together by using this clamping system.

FIG. 7C shows a variant of the washer of FIG. 7A that differs therefrom by the fact that the pre-deformed tabs 40 have free ends 40A that curve back so as to cover the vertex 12' of the cross-section of the collar, as can be seen more clearly in FIG. 8B. More precisely, the washer 128' shown in FIG. 7C differs from the washer 128 shown in FIG. 7A by the fact that the hooks 44' are extended compared with the hooks 44 so that, when the washer is in place relative to the collar, they come against the outside face of the branch 13B of the band 12 of the collar until they cover the vertex 12' of the band that is formed at the junction where the branches 13A and 13B meet. Thus, the hooks 44' hook onto the vertex 12', the free ends 40A of the pre-deformed tabs 40 being situated against the outside face of the branch 13A of the band. The hooks 44' thus have intermediate segments 44'A that curve back at 43' relative to the retaining segments 43 and to the end segments 44'B folded back at 43" relative to the intermediate segments 44'A and extending between said intermediate segments and the free ends 40A.

In the examples shown, the second pre-fitting tabs have flat cross-sections. However, it is also possible to make provision for them to have slightly convex cross-sections, so that they adapt to match the curvature of the bearing surface 18 of the second tube with which they co-operate. They could even be more markedly convex, which would impart a certain amount of stiffness to them.

Figure 3:
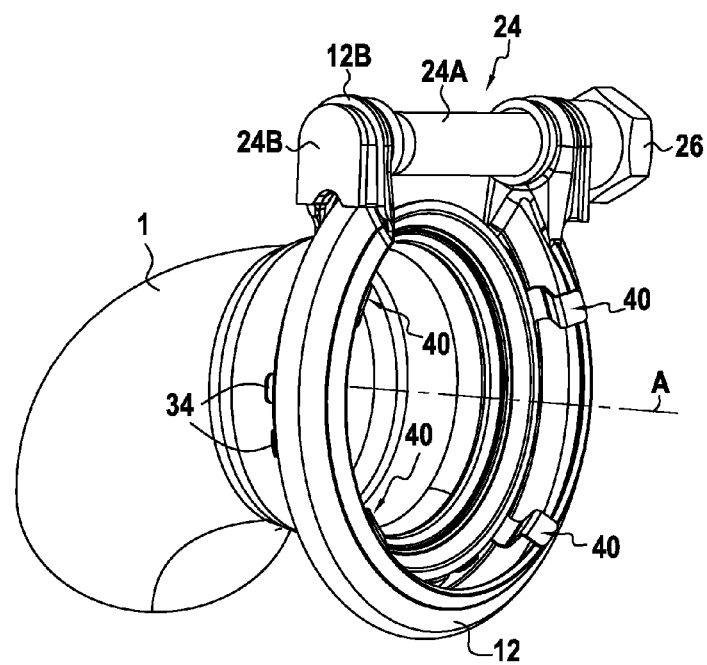
FIG. 3 is a perspective view showing the clamping system as pre-fitted on the first tube.
Figure 4:
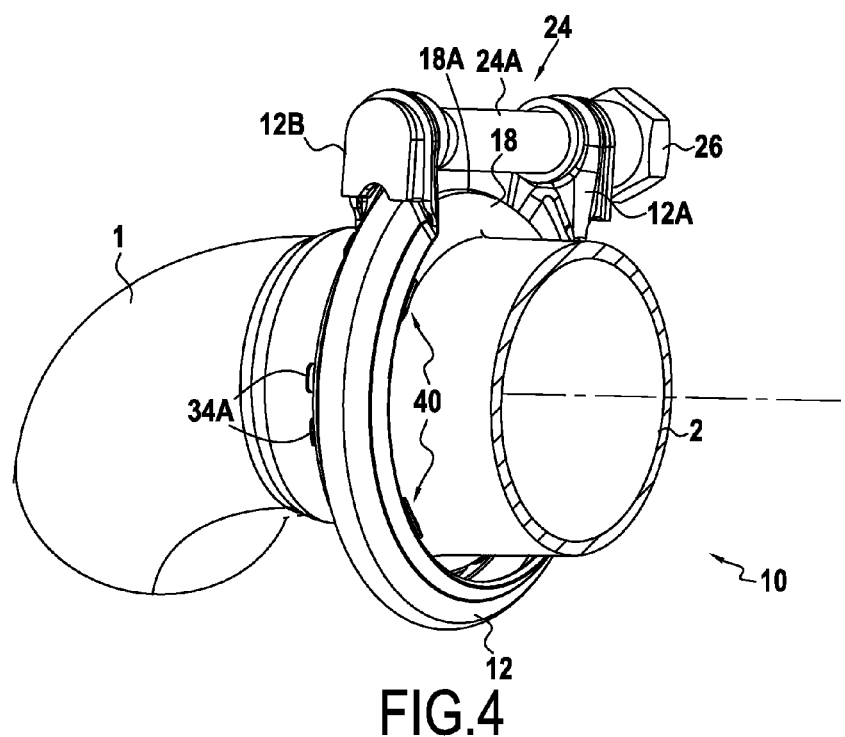
FIG. 4 is a perspective view corresponding to the FIG. 3 view and in which the second tube is also pre-fitted.
Figure 5:
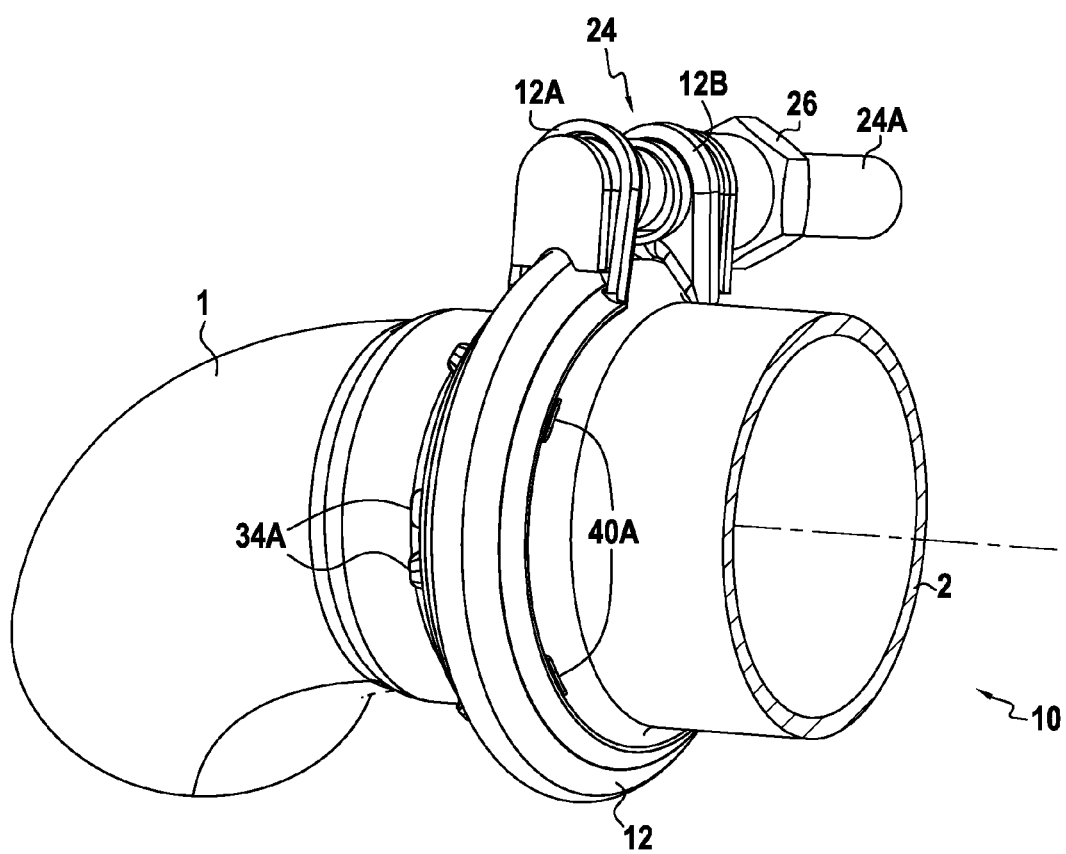
FIG. 5 is a perspective view corresponding to the FIG. 3 and FIG. 4 views, after the collar has been tightened, the two tubes then being connected together.

FIGS. 3 to 5 show various steps in assembling the clamping system with the tubes. In FIG. 3, which corresponds to the state shown in FIGS. 1A and 1B, the collar is in the non-tightened state, the washer 28 being fastened relative to said collar, and the assembly made up of the collar and of the washer is pre-fitted onto the end of the first tube 1. The two pre-fitting tabs 40 point towards the side of the collar that faces away from the first tube 1. It can be understood that, in order to pre-fit the second tube, it suffices to engage said tube into the collar, whereupon the vertex 18A of the bearing surface 18 co-operates with the second pre-fitting tabs 40 so as to cause them to flex outwards. By means of their resilience, these tabs then tend to flex back in once the second tube has come into position. In particular, when the second pre-fitting tabs are formed by the above-described pre-deformed tabs 40, said tabs going over the vertex 18A of the bearing surface 18 of the second tube at the junctions where the retaining segments 43 and the securing segments 42 meet causes the tabs 40 to move radially and resiliently outwards until the vertex 18A comes to be received substantially at the junctions where the joining segments 41 meet the securing segments, thereby enabling the tabs 40 to move back inwards slightly under the effect of their own resilience, thereby retaining the second tube so to prevent it from being torn out in the direction going away from the first tube.

FIG. 4 shows the situation in which the second tube is thus pre-fitted, with the collar still not being tightened. It can be seen that the free ends 40A of the tabs 40 are visible from the outside of the band of the collar. In this state, the two tubes are pre-assembled, by means of the clamping system that holds them in this position. Thus, the collar can be tightened with all the required attention, without it being necessary to pay attention, at the same time, to positioning the tubes correctly relative to each other.

In FIG. 5, the collar is tightened, and this tightening causes the tabs 40 to deform, which tabs then come to press against the inside periphery of the band 12, while retracting almost entirely into the setback 14 in said band. The fitting is analogous if the washers shown in FIGS. 7A to 7C are used, except that, in the situation shown in FIGS. 7A and 7C, the ends of the tabs 40 remain more visible outside the collar.

Figure 9:
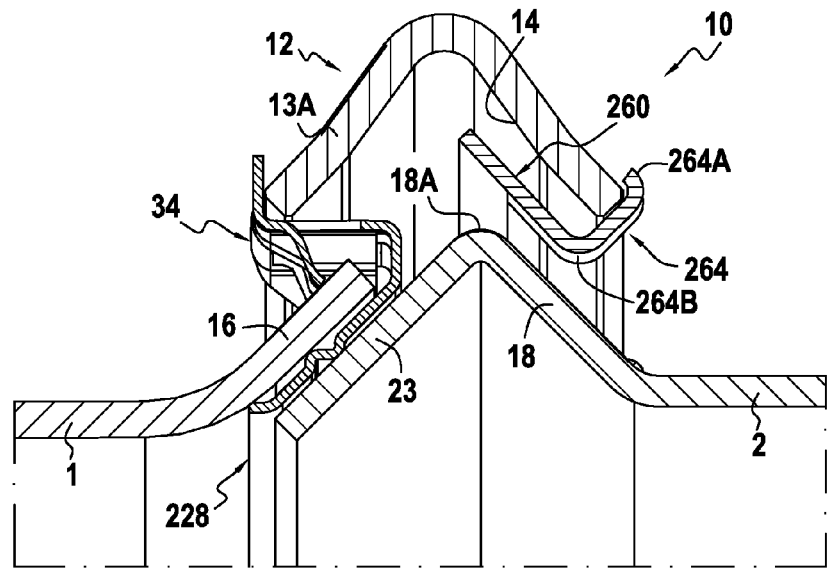
FIG. 9 is a view analogous to the FIG. 1A view, for another embodiment using an additional washer.
Figure 10:
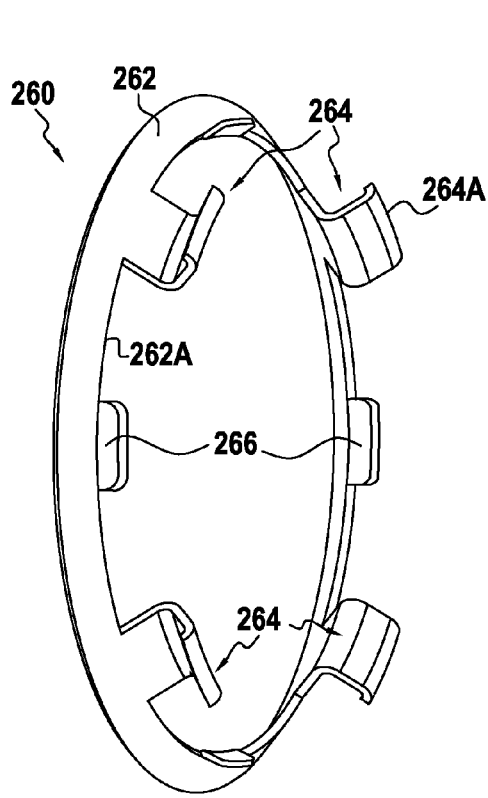
FIG. 10 is a perspective view of the additional washer.
Figure 11:
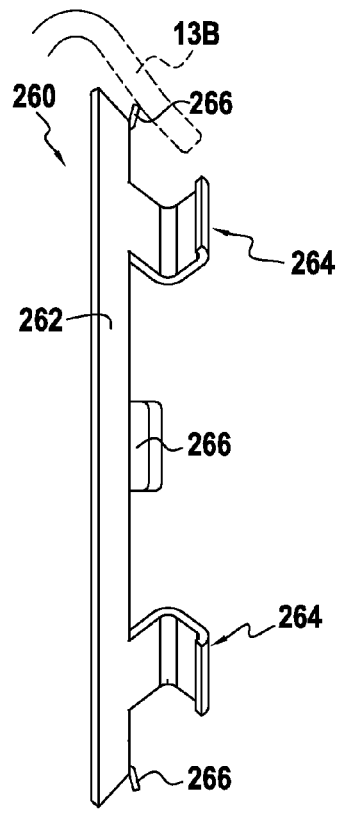
FIG. 11 is a side view of the additional washer.

There follows a description of FIGS. 9 to 11 that show a variant embodiment, using an additional washer. The washer 228 shown in FIG. 9 is analogous to the above-described washer 28, except that it is not provided with the second pre-fitting tabs. The second pre-fitting means are provided on an additional washer 260 that is secured to the second branch 13B of the band 12 of the collar.

In this example, as can be seen in FIG. 10, the additional washer 260 has a frustoconical portion 262 extending radially inwards no further than to the vertex 18A of the bearing surface 18, when the second tube is inserted in the setback 14 provided inside the band.

The second pre-fitting tabs equip the washer 228. They comprise tabs 264 that extend inwards from the inside periphery 262A of the frustoconical portion 262, and that then curve back outwards in such a manner as to come to be retained against the inside free edge of the second branch 13B of the band.

The second pre-fitting tabs further comprise spacer tabs 266 that point substantially axially, or that are slightly turned out in such a manner as to come to bear against the inside periphery of the second branch 13B as shown in FIG. 11, in which the branch 13B of the collar is shown sketched in so as to make the explanation clearer. The free ends of the tabs 264 curve back at 264A to come to rest against the outside periphery of the second branch 13B. Thus, the additional washer 260 is held relative to the second branch 13B of the collar by the action/reaction phenomenon of the spacer tabs 266 and of the hooks 264A, and the tabs 264 serve to pre-fit the second tube 2, their bend zones 264B defining, at rest, a diameter less than the diameter of the vertex 18A of the bearing surface 18 of the second tube. The tabs 264 and 266 are also deformable firstly so as to serve for pre-fitting the second tube relative to the tightening system and secondly so as not to oppose the tightening.

The invention claimed is:

1. A clamping system for connecting together a first tube and a second tube, facing ends of the tubes having bearing surfaces that project relative to cylindrical outside surfaces of the tubes, the system comprising:
    a collar;
    a washer secured to the collar, the collar having a band suitable for co-operating with the bearing surfaces via an inside periphery of the band that defines a setback into which the bearing surfaces can be inserted, the collar having a non-tightened state and a tightened state, the washer being distinct from the band;
    a first pre-fitting means for acting when the collar is in the non-tightened state to secure the collar to the first tube when the bearing surface of the first tube is engaged in the setback, such that the bearing surface of the first tube is kept apart from the inside periphery of the band; and
    a second pre-fitting means for acting, when the collar is secured to the first tube by the first pre-fitting means, to secure the collar to the second tube so as to resist a displacement of the second tube in the direction going away from the first tube when the bearing surface of the second tube is also engaged in the setback, such that the bearing surface of the second tube is kept apart from the inside periphery of the band,
    wherein the first pre-fitting means comprises first deformable pre-fitting tabs suitable for co-operating with the first tube.

2. A clamping system according to claim 1, wherein the second pre-fitting means comprises second deformable pre-fitting tabs suitable for co-operating with the second tube.

3. A clamping system according to claim 2, wherein the second pre-fitting tabs comprise at least one pre-deformed tab that, in axial section, has a joining segment joining to the washer and that extends outwards from the washer, and a securing segment for securing to the second tube and that extends between the joining segment and the free end of the pre-deformed tab while pointing inwards in the direction going towards the free end.

4. A clamping system according to claim 3, wherein the pre-deformed tab further comprises a retaining segment that extends between the securing segment for securing to the second tube and the free end of the pre-deformed tab, while pointing outwards in the direction going towards the free end, the retaining segment being suitable for co-operating with the band of the collar so as to retain the pre-deformed tab relative to the band.

5. A clamping system according to claim 3, wherein the pre-deformed tab is provided with a hook suitable for hooking onto a vertex portion of the collar band.

6. A clamping system according to claim 1, wherein the washer is secured to the collar by deformable fastening tabs that are integral with the washer.

7. A clamping system according to claim 6, wherein the first pre-fitting means is integral with the washer;
    the clamping system further comprises an additional washer, secured to the collar; and
    the second pre-fitting means is integral with the additional washer.

8. A clamping system according to claim 6, wherein the first pre-fitting means and the second pre-fitting means are integral with the washer.

9. A clamping system according to claim 1, wherein the washer is secured to the collar by fastening tabs that are situated on a first side of a surface of the washer;
the first pre-fitting means comprises first pre-fitting tabs that are also situated on the first side of the washer; and
the second pre-fitting means comprises second pre-fitting tabs that are situated on a second side of the washer that is opposite from the first side.

10. A clafnping system according to claim 1, wherein the second pre-fitting means comprises at least one tab that is of substantially constant width.

11. A clamping system according to claim 1, wherein the second pre-fitting means comprises at least one tab that is of width that decreases in the direction going towards its free end.

12. A clamping system according to claim 1, wherein the washer includes an annular sealing portion suitable for being sandwiched between first and second sealing surfaces belonging respectively to the first tube and to the second tube, when the tubes are clamped by means of the clamping system.

13. A clamping system according to claim 1, wherein the washer has a substantially frustoconical portion.

14. A clamping system according to claim 13, wherein the washer has an inside portion that extends substantially axially, and the inside portion extends from an inside edge of the substantially frustoconical portion by forming a turned-back segment.

15. A clamping system according to claim 1, wherein the washer has an inside portion that extends substantially axially.

16. A clamping system for connecting together a first tube and a second tube, facing ends of the tubes having bearing surfaces that project relative to cylindrical outside surfaces of the tubes, comprising:
a collar;
a washer secured to the collar, the collar having a band suitable for co-operating with the bearing surfaces via an inside periphery of the band that defines a setback into which the bearing surfaces can be inserted, the collar having a non-tightened state and a tightened state, the washer being distinct from the band;
first deformable pre-fitting tabs for securing the collar to the first tube when the bearing surface of the first tube is engaged in the setback while the collar is in the non-tightened state, such that the bearing surface of the first tube is kept apart from the inside periphery of the band; and
second deformable pre-fitting tabs for acting, when the collar is in the non-tightened state and is secured to the first tube by the first pre-fitting tabs, to secure the collar to the second tube so as to resist a displacement of the second tube in the direction going away from the first tube when the bearing surface of the second tube is also engaged in the setback, such that the bearing surface of the second tube is kept apart from the inside periphery of the band.

17. A clamping system according to claim 16, wherein the washer is secured to the collar by deformable fastening tabs that are integral with the washer.

18. A clamping system according to claim 16, wherein at least one set of tabs among the first pre-fitting tabs and the second pre-fitting tabs are integral with the washer.

19. A clamping system according to claim 16, wherein the washer is secured to the collar by deformable fastening tabs that are integral with the washer, the first pre-fitting tabs are integral with the washer, and the clamping system further comprises an additional washer, secured to the collar, the second pre-fitting tabs being integral with the additional washer.

* * * * *